(12) United States Patent
Wu (10) Patent No.: US 11,489,572 B2
(45) Date of Patent: Nov. 1, 2022

(54) HYBRID BEAM-FORMING METHOD AND DEVICE

(71) Applicant: ZTE Corporation, Shenzhen (CN)

(72) Inventor: Gang Wu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/299,576

(22) PCT Filed: Dec. 13, 2019

(86) PCT No.: PCT/CN2019/125348
§ 371 (c)(1),
(2) Date: Jun. 3, 2021

(87) PCT Pub. No.: WO2020/125557
PCT Pub. Date: Jun. 25, 2020

(65) Prior Publication Data
US 2022/0038150 A1 Feb. 3, 2022

(30) Foreign Application Priority Data
Dec. 21, 2018 (CN) .......................... 201811573011.3

(51) Int. Cl.
*H04L 5/12* (2006.01)
*H04B 7/06* (2006.01)
*H04B 7/08* (2006.01)

(52) U.S. Cl.
CPC ......... *H04B 7/0617* (2013.01); *H04B 7/0691* (2013.01); *H04B 7/086* (2013.01)

(58) Field of Classification Search
CPC ..... H04B 7/0617; H04B 7/0691; H04B 7/086
(Continued)

(56) References Cited

U.S. PATENT DOCUMENTS

2016/0142922 A1* 5/2016 Chen ............... H04W 16/28
375/267
2017/0331531 A1 11/2017 Wu
(Continued)

FOREIGN PATENT DOCUMENTS

CN 103748850 A 4/2014
CN 105814808 A 7/2016
(Continued)

OTHER PUBLICATIONS

European Patent Office. Extended European Search Report for EP Application No. 19897872.8, dated Jan. 4, 2022. pp. 1-9.
(Continued)

*Primary Examiner* — Zewdu A Kassa
(74) *Attorney, Agent, or Firm* — Vivacqua Crane, PLLC (57) ABSTRACT

A hybrid beamforming method and device are disclosed. The method may include: sending a test request of an analog beam corresponding to physical antennas and a test request of a digital beam corresponding to radio frequency (RF) front ends, the physical antennas being divided into at least two groups, in which each group of physical antennas corresponds to one of the RF front ends; within a preset test period, switching states of connection between the groups of physical antennas and the RF front ends; and after the test period is over, managing the states of connection between the physical antennas and the RF front ends according to test results for the test requests, where the test results comprise a test result for the analog beam and a test result for the digital beam.

11 Claims, 4 Drawing Sheets

(58) Field of Classification Search
USPC ........ 375/262, 261, 260, 259, 219, 316, 295
See application file for complete search history.

(56) References Cited

U.S. PATENT DOCUMENTS

| | | | |
|---|---|---|---|
| 2018/0198511 A1 | 7/2018 | Maamari et al. | |
| 2018/0199258 A1 | 7/2018 | Cezanne et al. | |
| 2018/0351619 A1* | 12/2018 | Khan | H04B 7/0897 |
| 2019/0109629 A1* | 4/2019 | Park | H04B 7/0456 |

FOREIGN PATENT DOCUMENTS

| | | |
|---|---|---|
| CN | 106033989 A | 10/2016 |
| CN | 106921990 A | 7/2017 |
| CN | 107947838 A | 4/2018 |
| WO | 2017039135 A1 | 3/2017 |
| WO | 2018184455 A1 | 10/2018 |

OTHER PUBLICATIONS

Intel Corporation. "UE reference architecture in mm Wave" 3GPP TSG-RAN4#82, R4-1700604, Feb. 17, 2017 (Feb. 17, 2017), entire document. Athens, Greece.

Ardah, Khaled. et al. "A Unifying Design of Hybrid Beamforming Architectures Employing Phase-Shifters or Switches" IEEE Transactions on Vehicular Technology, vol. 67, No. 11, Nov. 30, 2018 (Nov. 30, 2018), entire document.

International Search Report and Written Opinion for the International Patent Application No. PCT/CN2019/125348 dated Mar. 13, 2020.

The State Intellectual Property Office of People's Republic of China. First Office Action for CN Application No. 201811573011.3 and English translation, dated Mar. 4, 2022, pp. 1-17.

The State Intellectual Property Office of People's Republic of China. First Search Report for CN Application No. 201811573011.3 and English translation, dated Feb. 25, 2022, pp. 1-6.

* cited by examiner

HYBRID BEAM-FORMING METHOD AND DEVICE

CROSS-REFERENCE TO RELATED APPLICATION

This application is a national stage filing under 35 U.S.C. § 371 of international application number PCT/CN2019/125348, filed Dec. 13, 2019, which claims priority to Chinese patent application No. 201811573011.3, filed Dec. 21, 2018. The contents of these applications are incorporated herein by reference in their entirety. present disclosure

TECHNICAL FIELD

The present disclosure relates to the field of information processing, and in particular to a hybrid beamforming method and device.

BACKGROUND

An important characteristic of the fifth generation mobile communication (5G network, or 5G for short) system is that massive multiple-input multiple-output (massive MIMO) is used as the key technology to improve system reliability and capacity and expand cell coverage. In order to meet the requirements of International Telecommunication Union-International Mobile Telecommunications-2020 (ITU IMT-2020) for high system capacity of 5G systems, massive MIMO with up to 64 transmission ports is used in the New Radio (5G NR) of 3GPP, which is greatly improved compared with the maximum 8 transmission ports of 4G LTE-A. Especially in the millimeter wave band where the signal wavelength is short such that the antenna array occupies a small space with a high degree of integration, it is more suitable for the arrangement of massive antennas.

Figure 1A:
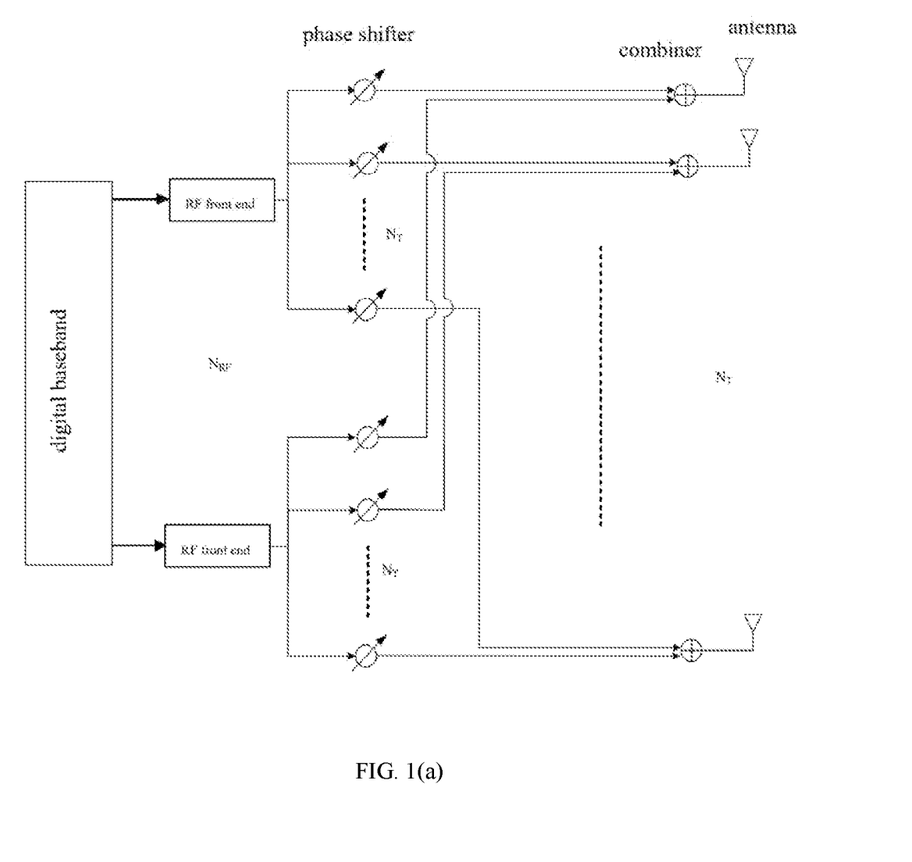
FIG. 1(a) is a schematic diagram of a connection mode for hybrid beamforming provided in the related art.
Figure 1B:
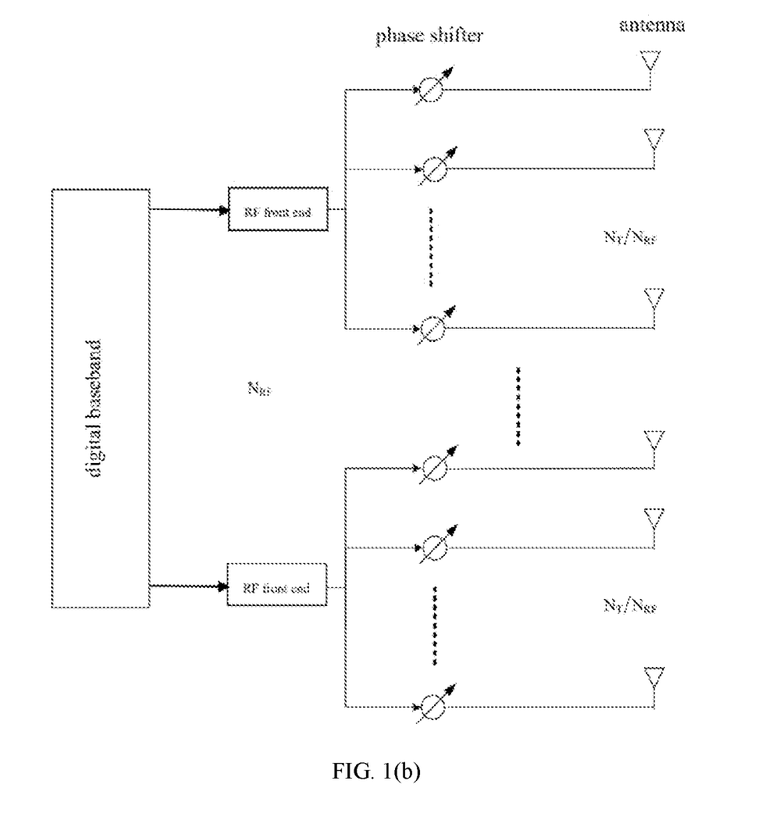
FIG. 1(b) is a schematic diagram of another connection mode for hybrid beamforming provided in the related art.

The 5G massive antennas adopt an approach of hybrid beamforming, that is, the processing of transmitted signals is divided into analog and digital domains, wherein the signals are firstly subjected to beamforming in the digital domain through baseband digital processing and radio frequency (RF) front ends and then subjected to beamforming in the analog domain through analog devices (phase shifters, etc.), and finally the beamformed RF signals are transmitted by multiple physical antennas. Assuming that the number of the RF front ends is $N_{RF}$, and the number of the transmit antennas is $N_T$, the analog and digital parts of hybrid beamforming in the related art have two connection modes: one is a fully connected mode, as shown in FIG. 1(a), in which each RF chain is connected to all the antennas, and the total number of the phase shifters is $N_T \times N_{RF}$; and the other is a partially connected mode, as shown in FIG. 1(b), in which each RF chain is connected to some of the antennas, and the total number of the phase shifters is $N_T/N_{RF}$. In the first fully connected mode, the number of the RF chains is equivalent to the number of the antennas, resulting in high costs, while compared with the first connection mode, the second connection mode is simple in structure, allowing for low costs and easy implementation, but at the expense of performance gain.

With the number of antenna ports and physical antennas increasing, the cost and performance gap between the two connection modes of hybrid beamforming will become larger and larger. How to enable the two to achieve a better compromise between costs and performance is still a technical problem to be solved.

SUMMARY

The present disclosure provides a hybrid beamforming method and device, which can realize a trade-off between the hardware cost and the system performance.

An embodiment according to the present disclosure provides a hybrid beamforming method, which may include: sending a test request of an analog beam corresponding to physical antennas and a test request of a digital beam corresponding to RF front ends, the physical antennas being divided into at least two groups, in which each group of physical antennas corresponds to one of the RF front ends; within a preset test period, switching states of connection between the groups of physical antennas and the RF front ends; and after the test period is over, managing the states of connection between the physical antennas and the RF front ends according to test results for the test requests, the test results may include a test result for the analog beam and a test result for the digital beam.

In an example embodiment, a duration of the test period equals one or at least two analog beamforming periods.

In an example embodiment, the states of connection between the groups of physical antennas and the RF front ends are realized by control switches, may include: each group of physical antennas being connected to a respective one of the RF front ends via a control switch, or each physical antenna in each group of physical antennas being connected to a respective phase shifter via a control switch.

In an example embodiment, before managing the states of connection between the physical antennas and the RF front ends according to test results for the test requests, the method may further include: acquiring the test results for the test requests, where a terminal side obtains the test results after executing the test requests.

In an example embodiment, the test results may include at least one of: measurements in an analog beam polling process corresponding to respective information of connection between the physical antennas and the RF front ends; measurements in the analog beam polling process corresponding to codebook information for analog precoding; or system capacity in a digital beamforming process corresponding to codebook information for digital precoding.

In an example embodiment, managing a hybrid beamforming circuit according to the test result for the analog beam and the test result for the digital beam may include at least one of: when configuration information for the hybrid beamforming is the information of connection between the physical antennas and the RF front ends, selecting target physical antennas and target RF front ends according to magnitude of numerical values of the measurements in the analog beam polling process and controlling the target physical antennas and the target RF front ends to be in a connected state; when the configuration information for the hybrid beamforming is the codebook information for the analog precoding, selecting first target codebook information for the analog precoding according to the magnitude of numerical values of the measurements in the analog beam polling process, and determining positions of the phase shifters connected to the physical antennas according to the first target codebook information; or, when the configuration information for the hybrid beamforming is the codebook information for digital precoding, selecting second target codebook information for the digital precoding according to magnitude of numerical values of the system capacity for digital beamforming, and configuring a PMI weighting operation for the digital precoding according to the second target codebook information.

In an example embodiment, selecting a codebook corresponding to a maximum value of the measurements in analog beamforming as the first target codebook information; and/or selecting a codebook corresponding to a maximum value of the system capacity of digital beamforming as the second target codebook information.

An embodiment according to the present disclosure provides a hybrid beamforming device, which may include a memory and a processor, where the memory has a computer program stored therein, which the processor invokes to implement any of the above methods.

An embodiment according to the present disclosure provides a hybrid beamforming method, which may include: receiving a test request for an analog beam corresponding to physical antennas and a test request for a digital beam corresponding to RF front ends, the physical antennas being divided into at least two groups, in which each group of physical antennas corresponds to one of the RF front ends; within a preset test period, computing test results under respective states of connection between the groups of physical antennas and the RF front ends, the test results may include a test result for the analog beam and a test result for the digital beam; and sending the test results.

In an example embodiment, the test results may include at least one of: measurements in an analog beam polling process corresponding to respective information of connection between the physical antennas and the RF front ends; measurements in the analog beam polling process corresponding to codebook information used for analog precoding; or system capacity in a digital beamforming process corresponding to codebook information used for digital precoding.

An embodiment according to the present disclosure provides a hybrid beamforming device, which may include a memory and a processor, where the memory has a computer program stored therein, which the processor invokes to implement any of the above methods.

According to the embodiments provided by the present disclosure, by sending a test request for an analog beam corresponding to physical antennas and a test request for a digital beam corresponding to RF front ends, switching states of connection between the groups of physical antennas and the RF front ends within a preset test period, and after the test period is over, managing the states of connection between the physical antennas and the RF front ends according to the test result for the analog beam and the test result for the digital beam, it is realized that the states of connection between the physical antennas and the RF front ends in the hybrid beamforming circuit are determined according to the test result of the analog beam and the test result of the digital beam collectively, such that the system performance is guaranteed on the premise of ensuring an appropriate hardware cost.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the appended claims and the accompanying drawings.

BRIEF DESCRIPTION OF DRAWINGS

The accompanying drawings are used to provide an optional understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

DETAILED DESCRIPTION

In order to make the purposes, technical schemes and advantages of the present disclosure clearer, the embodiments of the present disclosure will be described hereinafter in detail with reference to the accompanying drawings. It should be noted that any combinations of embodiments and features of the embodiments of the present disclosure without conflict are possible.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

Figure 2:
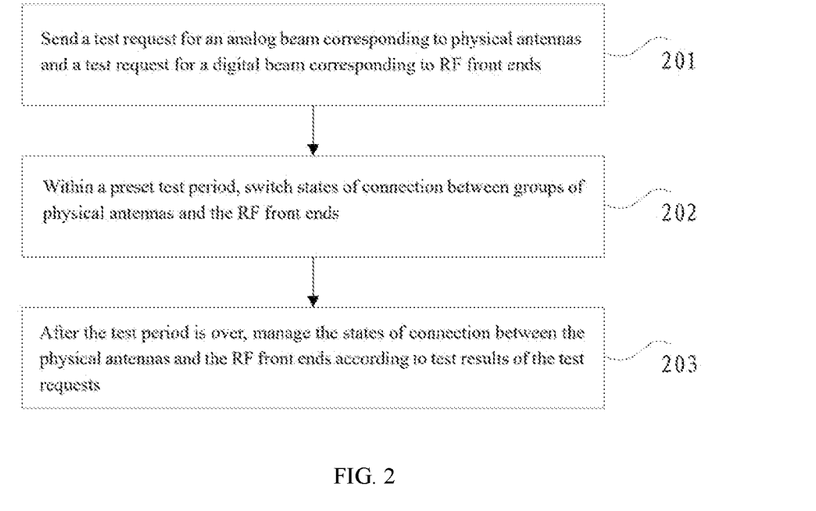
FIG. 2 is a flowchart of a hybrid beamforming method provided by the present disclosure.

FIG. 2 is a flowchart of a hybrid beamforming method provided by the present disclosure. The method shown in FIG. 1 includes the following steps.

At step 201, a test request is sent for an analog beam corresponding to physical antennas and a test request for a digital beam corresponding to RF front ends, the physical antennas being divided into at least two groups, in which each group of physical antennas corresponds to one of the RF front ends.

The physical antennas of the massive antennas are divided into groups, where each group corresponds to an RF front end of a digital antenna port, and the correspondence is dynamically changing over time according to a selection result of the antenna groups.

In an exemplary embodiment, radio resource control (RRC) channel state information-report configurations (CSI-ReportConfigs) are sent to a UE for each analog beam, including an analog precoding matrix indicator (PMI) enable that supports analog beamforming and a digital PMI enable that supports digital beamforming.

At step 202, within a preset test period, states of connection between the groups of physical antennas and the RF front ends are switched.

In this step, the states of connection are realized by controlling the states of communication between the physical antennas and the RF front ends, which states of communication are realized by control switches.

In an exemplary embodiment, the states of connection between the groups of physical antennas and the RF front ends are realized by control switches, including:

Mode 1: each group of physical antennas being connected to a respective one of the RF front ends via a control switch;

Mode 2: each physical antenna in each group of physical antennas being connected to a respective phase shifter via a control switch.

In the connection mode provided by Mode 1, those physical antennas arranged spatially adjacent to each other are assigned to one single group and are controlled by one and the same switch, which achieves the purpose of reducing the number of switches and thus reduces the hardware cost.

In the mode provided by Mode 2, each physical antenna is configured with a corresponding control switch, and when grouping physical antennas, there can be more combinations of the physical antennas, thus providing more choices.

At step 203, after the test period is over, the states of connection between the physical antennas and the RF front ends are managed according to test results for the test requests, the test results including the test result for the analog beam and the test result for the digital beam.

In this step, the states of connection between the physical antennas and the RF front ends in the hybrid beamforming circuit are managed according to the corresponding connection relationship with the best comprehensive performance of analog beam and digital beam signals.

According to the method embodiments provided by the present disclosure, by sending a test request for an analog beam corresponding to physical antennas and a test request for a digital beam corresponding to RF front ends, switching states of connection between the groups of physical antennas and the RF front ends within a preset test period, and after the test period is over, managing the states of connection between the physical antennas and the RF front ends according to the test result for the analog beam and the test result for the digital beam, it is realized that the states of connection between the physical antennas and the RF front ends in the hybrid beamforming circuit are determined according to the test result of the analog beam and the test result of the digital beam collectively, such that the system performance is guaranteed on the premise of ensuring an appropriate hardware cost.

The method shown in FIG. 2 will be explained below. In an exemplary embodiment, the duration of the test period equals one or at least two analog beamforming periods.

In this exemplary embodiment, the connection between the RF front ends and the physical antenna groups is periodically switched, and all the analog beams are polled in respective connection switching periods, where a whole connection switching period is a beamforming period.

In an exemplary embodiment, before managing the states of connection between the physical antennas and the RF front ends according to test results for the test requests, the method further includes: acquiring the test results for the test requests, where a terminal side obtains the test results after executing the test requests.

In this exemplary embodiment, the test results can be actively acquired from the terminal or received after being actively reported by the terminal.

In an exemplary embodiment, the test results include at least one of:
measurements in an analog beam polling process corresponding to respective information of connection between the physical antennas and the RF front ends;
measurements in the analog beam polling process corresponding to codebook information for analog precoding;
system capacity in a digital beamforming process corresponding to codebook information for digital precoding.

In this exemplary embodiment, the test results are all the test results obtained by the terminal side in this test period, or partial test results obtained by the terminal side in this test period.

Here, the partial test results may include at least one of:
the information of connection between the physical antennas and the RF front ends when the measurements in the analog beam polling process reach a preset first condition;
the codebook information used for the analog precoding when the measurements in the analog beam polling process reach the first condition;
the codebook information used for the digital precoding when the system capacity reaches a preset second condition in the digital beamforming process.

In this exemplary embodiment, managing the hybrid beamforming circuit according to the test result for the analog beam and the test result for the digital beam includes at least one of:
when configuration information for the hybrid beamforming is the information of connection between the physical antennas and the RF front ends, selecting target physical antennas and target RF front ends according to the magnitude of numerical values of the measurements in the analog beam polling process and controlling the target physical antennas and the target RF front ends to be in a connected state;
when the configuration information for the hybrid beamforming is the codebook information used for the analog precoding, selecting first target codebook information for the analog precoding according to the magnitude of numerical values of the measurements in the analog beam polling process, and determining positions of the phase shifters connected to the physical antennas according to the first target codebook information;
when the configuration information for the hybrid beamforming is the codebook information used for digital precoding, selecting second target codebook information for the digital precoding according to the magnitude of numerical values of the system capacity for digital beamforming, and configuring PMI weighting operation for the digital precoding according to the second target codebook information.

In an exemplary embodiment, selecting a codebook corresponding to a maximum value of the measurements in analog beamforming as the first target codebook information; and/or selecting a codebook corresponding to a maximum value of the system capacity of digital beamforming as the second target codebook information.

In this exemplary embodiment, an antenna selection mechanism is adopted, and the connection with the highest overall system capacity can be selected in each hybrid beamforming process, which prevents the increase of the performance gap between the partially connected mode and the fully connected mode with the number of antenna ports and physical antennas increasing, and provides better beams compared with the partially connected mode; moreover, under the antenna selection mechanism, the RF chains are still partially connected, which avoids the increase of complexity caused by the increase of the number of the RF chains in the fully connected mode, achieving a better compromise between the cost and the system performance.

Figure 3:
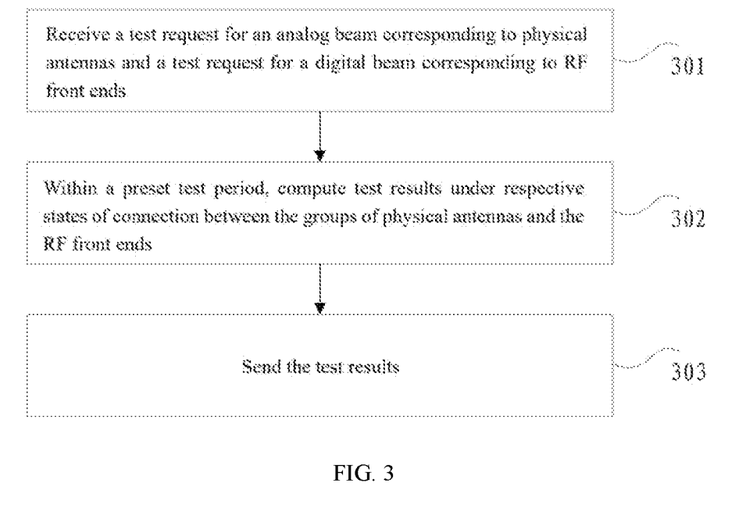
FIG. 3 is a flowchart of another hybrid beamforming method provided by the present disclosure.

FIG. 3 is a flowchart of another hybrid beamforming method provided by the present disclosure. The method shown in FIG. 3 includes the following steps.

At step 301, a test request for an analog beam corresponding to physical antennas and a test request for a digital beam corresponding to RF front ends are sent, where the physical antennas are divided into at least two groups, in which each group of physical antennas corresponds to one of the RF front ends.

In this exemplary embodiment, radio resource control (RRC) channel state information-report configurations (CSI-ReportConfigs) are received, including an analog PMI enable that supports analog beamforming and a digital PMI enable that supports digital beamforming.

At step 302, within a preset test period, test results are computed under respective states of connection between the groups of physical antennas and the RF front ends, the test results including a test result for the analog beam and a test result for the digital beam.

In an exemplary embodiment, the test results include at least one of:

measurements in an analog beam polling process corresponding to respective information of connection between the physical antennas and the RF front ends;

measurements in the analog beam polling process corresponding to codebook information for analog precoding;

system capacity in a digital beamforming process corresponding to codebook information for digital precoding.

At step 303, the test results are sent.

In an exemplary embodiment, the test results can be reported actively, or sent upon reception of a request to report the test results.

According to the method embodiments provided by the present disclosure, by receiving a test request for an analog beam corresponding to physical antennas and a test request for a digital beam corresponding to RF front ends, computing test results within a preset test period under respective states of connection between the groups of physical antennas and the RF front ends, and sending the test results, it is realized that the hybrid beamforming circuit is determined according to the test result of the analog beam and the test result of the digital beam collectively, such that the system performance is guaranteed on the premise of ensuring an appropriate hardware cost.

The method provided by the present disclosure is optionally explained below.

The problem to be solved in the present disclosure report is how to reduce the complexity of massive antenna receiving and transmitting channels in hybrid beamforming while avoiding the performance degradation caused by the partially connected mode between the analog and digital parts, so as to achieve the best possible compromise between cost and system performance.

A new hybrid beamforming method is proposed by the present disclosure, including:

sending an enable signal by a base station side for measurement of analog beams corresponding to grouped physical antennas and digital beams corresponding to digital ports, and measuring, by a terminal, quality of signals corresponding to the analog beams and digital beams, where the physical antennas of the massive antennas are divided into groups, and each group corresponds to an RF front end of a digital antenna port, and the correspondence is dynamically changing over time according to a selection result of the antenna groups;

dynamically switching, by the base station side, the connection with the analog beam corresponding to the analog antenna grouping, so that the terminal side can measure all possible connections and provide feedbacks therefor;

according to the feedbacks from the terminal, selecting, by the base station side, the corresponding connection relationship with the best comprehensive performance of the analog and digital beam signals to transmit subsequent data signals.

The base station side determines the circuit for hybrid beamforming based on the criterion of maximum system capacity under hybrid beamforming and the comprehensive performance measured corresponding to the maximum measurements, so as to carry out signal transmission on the basis of this circuit.

Embodiment I

Figure 4A:
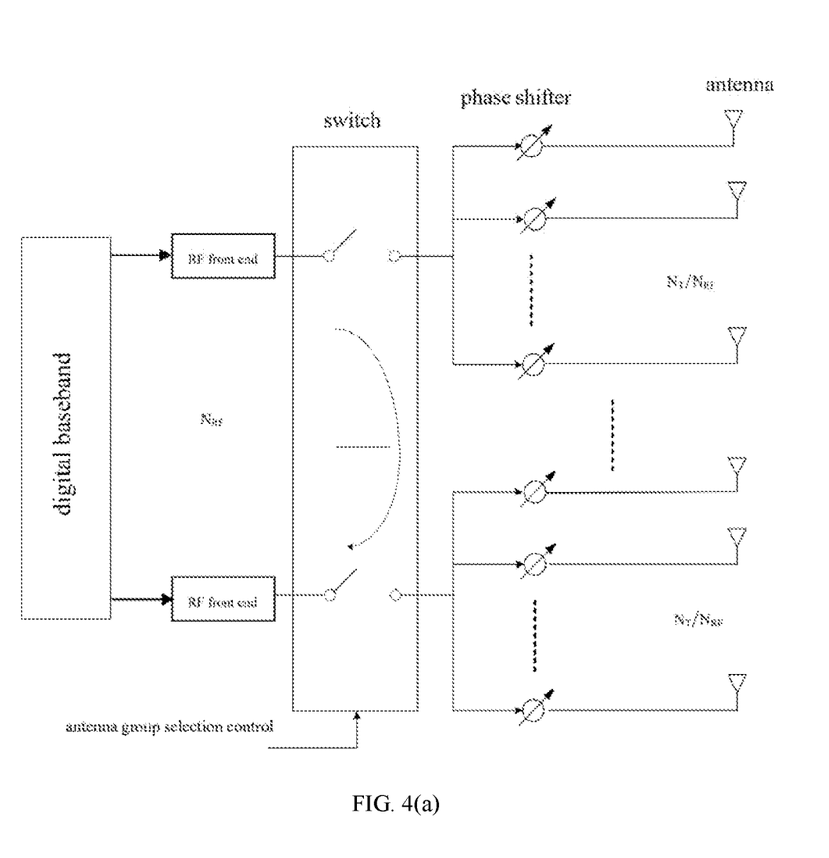
FIG. 4(a) is a schematic diagram of a connection mode for hybrid beamforming provided in Embodiment I of the present disclosure.

FIG. 4(a) is a schematic diagram of a connection mode for hybrid beamforming provided in Embodiment I of the present disclosure. As shown in FIG. 4(a), the analog beamforming and the digital beamforming are carried out jointly. The 5G NR base station (gNB) firstly forms a multi-port digital beamforming signal stream through baseband digital processing, and then sends it to an antenna group selection unit through a plurality of corresponding RF front ends. Each RF front end is connected to a corresponding antenna group under the control of a corresponding selection signal. Finally, a beamformed RF signal is transmitted out through a plurality of physical antennas. Here, the antenna group selection process includes three kinds of polling: antenna group switching, analog beam, and digital beam, and the computation is done inside the receiver. Specifically, the following steps are involved.

At step A1, connections between RF front ends of the gNB and antenna groups are periodically switched, and all the analog beams are polled in respective connection switching periods, where a whole connection switching period is an analog beamforming period.

At step A2, in each connection, the gNB sends radio resource controlling (RRC) channel state information-report configurations (CSI-ReportConfigs) to a UE for each analog beam, which include an analog precoding matrix indicator (PMI) enable that supports analog beamforming and a digital PMI enable that supports digital beamforming.

At step A3, the UE performs the analog precoding computation for each connection and each analog beam to complete one analog beam polling, and the UE further performs computation in the polling process of each analog beam for each digital precoding in turn to achieve the maximum system capacity, and reports codebook numbers for the connection number, analog precoding and digital precoding, The maximum system capacity criterion for hybrid beamforming is expressed as follows.

Assuming that a received signal Y of UE can be expressed as:

$$Y = HADs + n \quad (1)$$

where H represents a channel matrix, A represents analog beamforming weights (corresponding to the phase shift value of the phase shifter) under antenna group switching, D represents digital beamforming weights (corresponding to the digital precoding matrix PMI), s is the transmission symbol, and n is the noise.

The criterion of the maximum system capacity R is expressed as follows:

$$R = \log_2 \det\{I + H^H A^H D^H DAH\} \quad (2)$$

where the superscript H represents a conjugate transpose, det represents a determinant, and I represents a unit matrix.

At step A4, the gNB generates a control signal for the connection between the RF front ends and the antenna groups according to the connection number in a poll, configures the corresponding connection under the control signal, sets the analog phase shifters according to the analog precoding codebook number and performing digital PMI weighting according to the digital precoding codebook number, and then carries out subsequent data signal transmission, thus completing a hybrid beamforming process.

Embodiment II

Figure 4B:
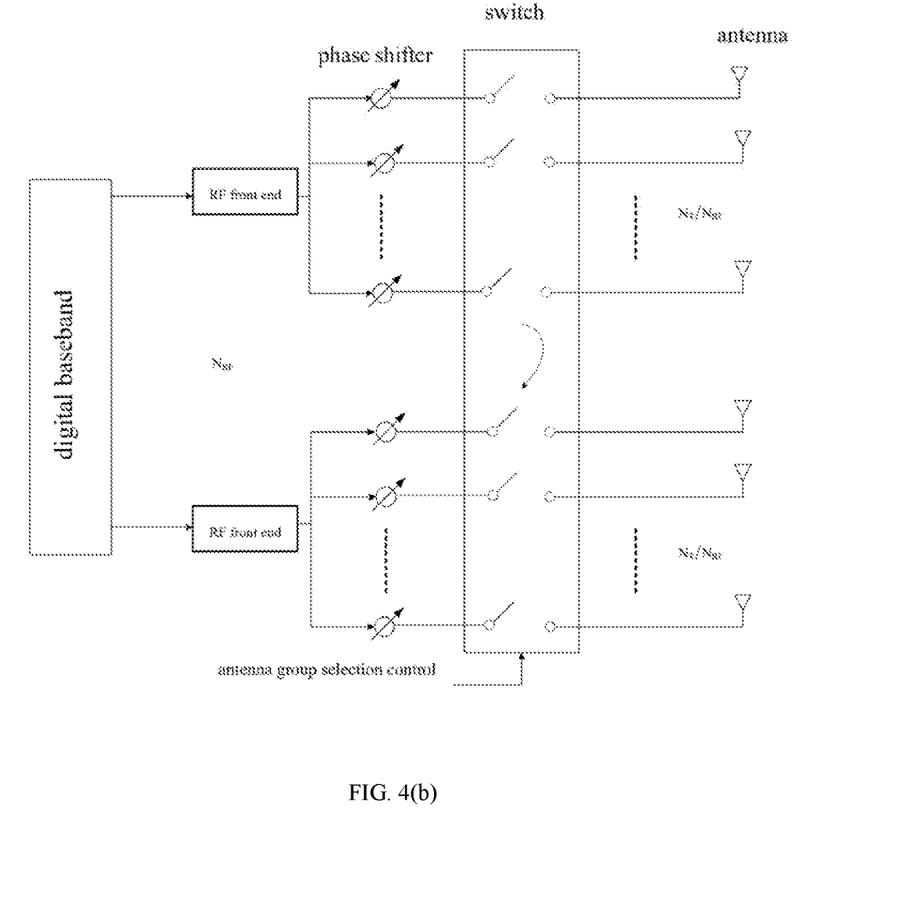
FIG. 4(b) is a schematic diagram of a connection mode for hybrid beamforming provided in Embodiment II of the present disclosure.

FIG. 4(b) is a schematic diagram of a connection mode for hybrid beamforming provided in Embodiment II of the present disclosure. As shown in FIG. 4(b), the analog beamforming and the digital beamforming are carried out individually. The 5G NR base station (gNB) firstly forms a multi-port digital beamforming signal stream through baseband digital processing, and then sends it to an antenna group selection unit through a plurality of corresponding RF front ends and phase shifters. The phase shifters are connected to respective antenna groups under the control of a corresponding selection signal. Finally, a beamformed RF signal is transmitted out through a plurality of physical antennas. Here, the hybrid beamforming process actually includes three kinds of polling: antenna group switching, analog beam, and digital beam, among which the first two are completed by the cooperation of the transmitter and receiver, and the last one is completed inside the receiver. The method includes the following steps.

At step B1, connections between RF front ends of the gNB and antenna groups are periodically switched, and all the analog beams are polled in respective connection switching periods, where a whole connection switching period is a beamforming period.

At step B2, in each connection, the gNB sends radio resource control (RRC) information to a UE for each analog beam, which includes CSI-ReportConfigs that supports analog beamforming (where the reportQuantity includes CSI-reference signal received power (CSI-RSRP) and CSI-reference signal received quality (CSI-RSRQ)).

At step B3, the UE performs computation for each connection and each analog beam measurement, i.e., CSI-RSRP and CSI-RSRQ, finishes one polling for the analog beam and reports measurement values.

At step B4, the gNB selects the corresponding connection and the corresponding analog beam with the maximum measurements based on all the reported measurements in one polling to generate a control signal for the connection between the phase shifters and the antenna groups, and configures the corresponding connection and sets the corresponding phase shifters under the control signal.

At step B5, the gNB sends radio resource control (RRC) information to UE1 and UE2, where the RRC includes CSI-ReportConfigs (where the reportQuantity includes CRI-RI-PMI-CQI).

At step B6, the UE computes with the channel state information CRI-RI-PMI-CQI, selects the appropriate digital precoding to ensure the maximum system capacity for digital beamforming (see Equation 2), and reports the codebook number of the digital precoding.

At step B7, the gNB performs digital PMI weighting according to the digital precoding codebook number, and then carries out subsequent data signal transmission, thus completing a hybrid beamforming process.

In summary, according to the hybrid beamforming method based on antenna group switching provided in Embodiment II of the present disclosure, an antenna selection mechanism is adopted, and the connection with the highest overall system capacity can be selected in each hybrid beamforming process, which prevents the increase of the performance gap between the partially connected mode and the fully connected mode with the number of antenna ports and physical antennas increasing, and provides better beams compared with the partially connected mode; moreover, under the antenna selection mechanism, the RF chains are still partially connected, which avoids the increase of complexity caused by the increase of the number of the RF chains in the fully connected mode, achieving a better compromise between the cost and the system performance.

A hybrid beamforming device provided by the application includes a memory and a processor, where the memory has a computer program stored therein, which the processor invokes to implement the method shown in FIG. 2.

Another hybrid beamforming device provided by the application includes a memory and a processor, where the memory has a computer program stored therein, which the processor invokes to implement the method shown in FIG. 3.

It can be understood by those skilled in the art that all or some of the steps of the methods, systems, and functional modules/units in the devices disclosed above can be implemented as software, firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the components may be implemented as software executed by a processor, such as a digital signal processor or a microprocessor, or as hardware, or as an integrated circuit, such as an application specific integrated circuit. Such software can be distributed on computer-readable media, which can include computer storage media (or non-transitory media) and communication media (or transitory media). As well known to those of ordinary skill in the art, the term computer storage medium includes volatile and nonvolatile, removable and non-removable media implemented in any method or technology configured to store information, such as computer readable instructions, data structures, program modules, or other data. A computer storage medium includes, but is not limited to, RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer readable instructions, data structures, program modules or other data in a modulated data signal such as a carrier wave or other transmission mechanism, and can include any information delivery media.

INDUSTRIAL APPLICABILITY

In the embodiments provided by the present disclosure, by sending a test request for an analog beam corresponding to physical antennas and a test request for a digital beam corresponding to RF front ends, switching states of connection between the groups of physical antennas and the RF front ends within a preset test period, and after the test period is over, managing the states of connection between the physical antennas and the RF front ends according to the test result for the analog beam and the test result for the digital beam, the states of connection between the physical antennas and the RF front ends in the hybrid beamforming circuit are determined according to the test result of the analog beam and the test result of the digital beam collectively so that the technical effect of guaranteeing the system performance is achieved on the premise of ensuring an appropriate hardware cost.

The invention claimed is:

1. A hybrid beamforming method, comprising:
   sending a test request of an analog beam corresponding to physical antennas and a test request of a digital beam corresponding to radio frequency (RF) front ends, the physical antennas being divided into at least two groups, in which each group of physical antennas corresponds to one of the RF front ends;
   within a preset test period, switching states of connection between the groups of physical antennas and the RF front ends;
   after the test period is over, managing the states of connection between the physical antennas and the RF front ends according to test results for the test requests, wherein the test results comprise at least one of:
      measurements in an analog beam polling process corresponding to respective information of connection between the physical antennas and the RF front ends;
      measurements in the analog beam polling process corresponding to codebook information for analog precoding; or
      system capacity in a digital beamforming process corresponding to codebook information for digital precoding; and
   managing a hybrid beamforming circuit according to the test result comprising at least one of:
      when configuration information for hybrid beamforming is the information of connection between the physical antennas and the RF front ends, selecting target physical antennas and target RF front ends according to the magnitude of numerical values of the measurements in the analog beam polling process and controlling the target physical antennas and the target RF front ends to be in a connected state;
      when the configuration information for the hybrid beamforming is the codebook information for the analog precoding, selecting first target codebook information for the analog precoding according to the magnitude of numerical values of the measurements in the analog beam polling process, and determining positions of the phase shifters connected to the physical antennas according to the first target codebook information; or
      when the configuration information for the hybrid beamforming is the codebook information for digital precoding, selecting second target codebook information for the digital precoding according to the magnitude of numerical values of the system capacity for digital beamforming, and configuring precoding matrix indicator (PMI) weighting operation for the digital precoding according to the second target codebook information.

2. The method of claim 1, wherein the duration of the test period equals one or at least two analog beamforming periods.

3. The method of claim 1, wherein the states of connection between the groups of physical antennas and the RF front ends are realized by control switches, comprising:
   each group of physical antennas being connected to a respective one of the RF front ends via a control switch, or
   each physical antenna in each group of physical antennas being connected to a respective phase shifter via a control switch.

4. The method of claim 1, wherein before managing the states of connection between the physical antennas and the RF front ends according to test results for the test requests, the method further comprises:
   acquiring the test results for the test requests, wherein a terminal side obtains the test results after executing the test requests.

5. The method of claim 1, wherein
   selecting a codebook corresponding to a maximum value of the measurements in analog beamforming as the first target codebook information; and/or selecting a codebook corresponding to a maximum value of the system capacity of digital beamforming as the second target codebook information.

6. A hybrid beamforming method, comprising:
   receiving a test request for an analog beam corresponding to physical antennas and a test request for a digital beam corresponding to radio frequency (RF) front ends, the physical antennas being divided into at least two groups, in which each group of physical antennas corresponds to one of the RF front ends;
   within a preset test period, computing test results under respective states of connection between the groups of physical antennas and the RF front ends, the test results comprising at least one of:
      measurements in an analog beam polling process corresponding to respective information of connection between the physical antennas and the RF front ends;
      measurements in the analog beam polling process corresponding to codebook information for analog precoding; or
      system capacity in a digital beamforming process corresponding to codebook information for digital precoding;
   sending the test results; and
   managing a hybrid beamforming circuit according to the test result comprising at least one of:
      when configuration information for hybrid beamforming is the information of connection between the physical antennas and the RF front ends, selecting target physical antennas and target RF front ends according to the magnitude of numerical values of the measurements in the analog beam polling process and controlling the target physical antennas and the target RF front ends to be in a connected state;
      when the configuration information for the hybrid beamforming is the codebook information for the analog precoding, selecting first target codebook information for the analog precoding according to the magnitude of numerical values of the measurements in the analog beam polling process, and determining positions of the phase shifters connected to the physical antennas according to the first target codebook information; or when the configuration information for the hybrid beamforming is the codebook information for digital precoding, selecting second target codebook information for the digital precoding according to the magnitude of numerical values of the system capacity for digital beamforming, and configuring precoding matrix indicator (PMI) weighting operation for the digital precoding according to the second target codebook information.

7. A hybrid beamforming device comprising a memory and a processor, wherein the memory stores a computer program which, when executed by the processor, causes the processor to perform a hybrid beamforming method, comprising:

sending a test request of an analog beam corresponding to physical antennas and a test request of a digital beam corresponding to radio frequency (RF) front ends, the physical antennas being divided into at least two groups, in which each group of physical antennas corresponds to one of the RF front ends;

within a preset test period, switching states of connection between the groups of physical antennas and the RF front ends; and after the test period is over, managing the states of connection between the physical antennas and the RF front ends according to test results for the test requests, wherein the test results comprise at least one of:

measurements in an analog beam polling process corresponding to respective information of connection between the physical antennas and the RF front ends;

measurements in the analog beam polling process corresponding to codebook information for analog precoding; or system capacity in a digital beamforming process corresponding to codebook information for digital precoding; and managing a hybrid beamforming circuit according to the test result comprising at least one of:

when configuration information for hybrid beamforming is the information of connection between the physical antennas and the RF front ends, selecting target physical antennas and target RF front ends according to the magnitude of numerical values of the measurements in the analog beam polling process and controlling the target physical antennas and the target RF front ends to be in a connected state;

when the configuration information for the hybrid beamforming is the codebook information for the analog precoding, selecting first target codebook information for the analog precoding according to the magnitude of numerical values of the measurements in the analog beam polling process, and determining positions of the phase shifters connected to the physical antennas according to the first target codebook information; or when the configuration information for the hybrid beamforming is the codebook information for digital precoding, selecting second target codebook information for the digital precoding according to the magnitude of numerical values of the system capacity for digital beamforming, and configuring precoding matrix indicator (PMI) weighting operation for the digital precoding according to the second target codebook information.

8. A hybrid beamforming device comprising a memory and a processor, wherein the memory stores a computer program which, when executed by the processor, causes the processor to perform a hybrid beamforming method, comprising:

receiving a test request for an analog beam corresponding to physical antennas and a test request for a digital beam corresponding to radio frequency (RF) front ends, the physical antennas being divided into at least two groups, in which each group of physical antennas corresponds to one of the RF front ends;

within a preset test period, computing test results under respective states of connection between the groups of physical antennas and the RF front ends, the test results comprising at least one of:

measurements in an analog beam polling process corresponding to respective information of connection between the physical antennas and the RF front ends;

measurements in the analog beam polling process corresponding to codebook information for analog precoding; or system capacity in a digital beamforming process corresponding to codebook information for digital precoding;

sending the test results; and managing a hybrid beamforming circuit according to the test result comprising at least one of:

when configuration information for hybrid beamforming is the information of connection between the physical antennas and the RF front ends, selecting target physical antennas and target RF front ends according to the magnitude of numerical values of the measurements in the analog beam polling process and controlling the target physical antennas and the target RF front ends to be in a connected state;

when the configuration information for the hybrid beamforming is the codebook information for the analog precoding, selecting first target codebook information for the analog precoding according to the magnitude of numerical values of the measurements in the analog beam polling process, and determining positions of the phase shifters connected to the physical antennas according to the first target codebook information; or when the configuration information for the hybrid beamforming is the codebook information for digital precoding, selecting second target codebook information for the digital precoding according to the magnitude of numerical values of the system capacity for digital beamforming, and configuring precoding matrix indicator (PMI) weighting operation for the digital precoding according to the second target codebook information.

9. The method of claim 2, wherein the test results comprise at least one of:

measurements in an analog beam polling process corresponding to respective information of connection between the physical antennas and the RF front ends;

measurements in the analog beam polling process corresponding to codebook information for analog precoding; or system capacity in a digital beamforming process corresponding to codebook information for digital precoding.

10. The method of claim 3, wherein the test results comprise at least one of:
   measurements in an analog beam polling process corresponding to respective information of connection between the physical antennas and the RF front ends;
   measurements in the analog beam polling process corresponding to codebook information for analog precoding; or
   system capacity in a digital beamforming process corresponding to codebook information for digital precoding.

11. The method of claim 4, wherein the test results comprise at least one of:
   measurements in an analog beam polling process corresponding to respective information of connection between the physical antennas and the RF front ends;
   measurements in the analog beam polling process corresponding to codebook information for analog precoding; or
   system capacity in a digital beamforming process corresponding to codebook information for digital precoding.

* * * * *